July 3, 1956  J. H. ANDRESEN, JR  2,753,415
PRESSURE RESPONSIVE SWITCH
Filed May 7, 1952  2 Sheets-Sheet 1

INVENTOR.
JOHN H. ANDRESEN, JR.
BY
Ostrolenk & Faber
ATTORNEYS

July 3, 1956

J. H. ANDRESEN, JR 2,753,415

PRESSURE RESPONSIVE SWITCH

Filed May 7, 1952

INVENTOR.
John H. Andresen, Jr.

BY
Ostrolenk & Faber
ATTORNEYS

United States Patent Office 2,753,415
Patented July 3, 1956

2,753,415

PRESSURE RESPONSIVE SWITCH

John H. Andresen, Jr., Greenwood Lake, N. Y., assignor to Kollsman Instrument Corporation, Elmhurst, N. Y., a corporation of New York Application March 7, 1952, Serial No. 275,373

1 Claim. (Cl. 200—83)

My present invention relates to an electrical switch and more particularly it relates to a pressure responsive electrical switch.

As is well-known in the art, electrical switches can be made responsive to changes in pressure by the addition of pressure responsive members like aneroid capsules. These members contract or expand in response to changes in pressure and can be positioned so that they transmit these changes in size to the operating pin of an electrical switch.

More specifically, there are two main classes of pressure switches: (a) those responsive to absolute pressure, (b) those responsive to pressure difference.

In the first class belong all the pressure switches that operate when the pressure reaches a certain value above vacuum, while to the second class belong all the pressure switches that operate when a certain difference of pressure reaches a certain value.

More generally, therefore, all pressure switches respond to differences in pressure with this main distinction, that absolute pressure switches have, as reference level, vacuum, while the other class of pressure switches has as reference level another value of pressure different from vacuum.

Pressure responsive switches are used in many different fields, for example, in aviation where they are used to make certain electrical circuits responsive to altitudes.

When pressure switches are used in mobile equipment as on airplanes, a serious problem arises: sudden movements of the airplane can produce an unwanted displacement of the pressure sensing capsules resulting in an uncalled for operation of the pressure responsive switch.

My present invention overcomes this problem by providing (1) a system of diaphragms which can also operate as springs, (2) a separate spring connected to the movable contact member, (3) an electric switch secured to the diaphragms in such a position that accelerations will not produce faulty operation of the electrical switch.

Furthermore, the electric switch of my novel pressure responsive switch is provided with contacts that are both movable and sealed in a vacuum so that they are thoroughly protected from any contamination.

One contact is suspended from the housing by means of one of the two outer cells and is secured also to one of the membranes which make the center capsule. The other contact is secured to the other membrane of the center capsule and is suspended by means of the second outer cell with the cooperation of the conducting coil spring.

When used as an absolute pressure switch, the center capsule is all evacuated while the 2 outer cells are subjected both inside and outside to the pressure in the case, which is the operating pressure.

When subjected to acceleration, the two outer cells which act as springs are identical and being loaded equally cause their respective contacts to move simultaneously and in the same direction under acceleration, thus retaining the two contacts at a constant separation.

My invention provides also means to make the pressure switch not immediately responsive to sudden variations in pressure caused, for example, by sudden drops of an airplane from its normal course. More specifically, my pressure switch will operate with a certain time lag so that it will operate only if these sudden variations in pressure are maintained for a certain length of time or if the variations in pressure occur slowly.

This improvement is achieved in my invention by means of a capillary tube connecting the interior of the two outer cells to the region having the pressure to which the switch is responsive, from now on referred to as "external pressure." It is thus seen that a sudden change, for example, a drop in this pressure causes the center capsule to immediately respond to the drop in pressure and to expand. If the outer cells were provided with large openings instead of with the capillary tube, the expansion of the center capsule would produce immediate opening of the switch contacts. Because of the presence of the capillary tube, the pressure inside the outer cells cannot follow instantaneously changes in external pressure so that at the initial time the outer cells will also operate as a pressure responsive member and if a drop in pressure is here considered, it will expand. The tendency of the outer cells to expand will nullify the similar tendency of the center capsule, thus leaving the switch contacts near their initial positions. If this lower external pressure should persist, the pressure in the outer cells will slowly reach the level of external pressure since air from inside the outer cells will slowly leak out through the capillary tube. And if the lower pressure should persist for a sufficiently long time, the outer cells will contract under the expansive pressure from the inner cell allowing the two contacts of the pressure switch to separate from each other.

When, on the other hand, changes in pressure occur slowly as when an airplane rises at a normal rate, the pressure inside the outer cells can follow closely the outside pressure since the external pressure is changing slowly. When then a certain absolute pressure is reached, the center capsule will have expanded sufficiently to open the contacts of the pressure switch without meeting any opposition from the outer cells since they are not now operating as a pressure responsive member, having their inner pressure equal to the external pressure.

The main object of my present invention is the provision of means for compensating the effect of vibration and acceleration.

A secondary object of my present invention is the provision of means whereby pressure responsive switches using aneroids are not affected by sudden variations in pressure unless they persist for a relatively long interval of time.

A more specific object of my present invention is the provision of means whereby aneroids are used not only as pressure responsive elements but also as spring members.

Another object of my present invention is the provision of capillary means which in cooperation with a capsule provides a time delay for my pressure responsive switch.

All elements of my novel pressure responsive switch are suspended by means of springs and never come into frictional engagement with other elements during their operation.

The center capsule serves also to seal the contacts and thereby protect them from damage and corrosion or contamination from atmospheric or dust conditions.

My pressure responsive switch can also be adjusted to respond to different values of pressure. This is obtained by providing one of the outer cells with a block having a threaded bore engageable by a screw supported on the housing. Appropriate rotation of the screw produces displacement of this cell with respect to the other, thus producing a tension on the center, or operating capsule. This tension must be overcome by the operating pressure to close the switch.

The complete apparatus consisting of the pressure responsive members, the two movable contacts, and the regulating means, is mounted on a base and completely covered by a housing made airtight by means of a circular gasket. An opening in the base leads to an inlet tube, so that the switch will not be affected by ambient pressure, but will respond solely to external pressure through the inlet tube.

Accordingly, another object of my present invention is the provision of a frictionless pressure responsive switch.

A further object of my present invention is the provision of means whereby the contacts are protected from extraneous substances.

Another object of my present invention is the provision of means whereby the pressure responsive elements can be easily adjusted for making them responsive to different values of pressure.

A further object of my present invention is the provision of means whereby the pressure responsive members are not affected by ambient pressure.

Another object of my present invention is a pressure switch structure that is rugged and inexpensive.

The foregoing and many other objects of my invention will become apparent in the following description and drawings in which.

Figure 1:
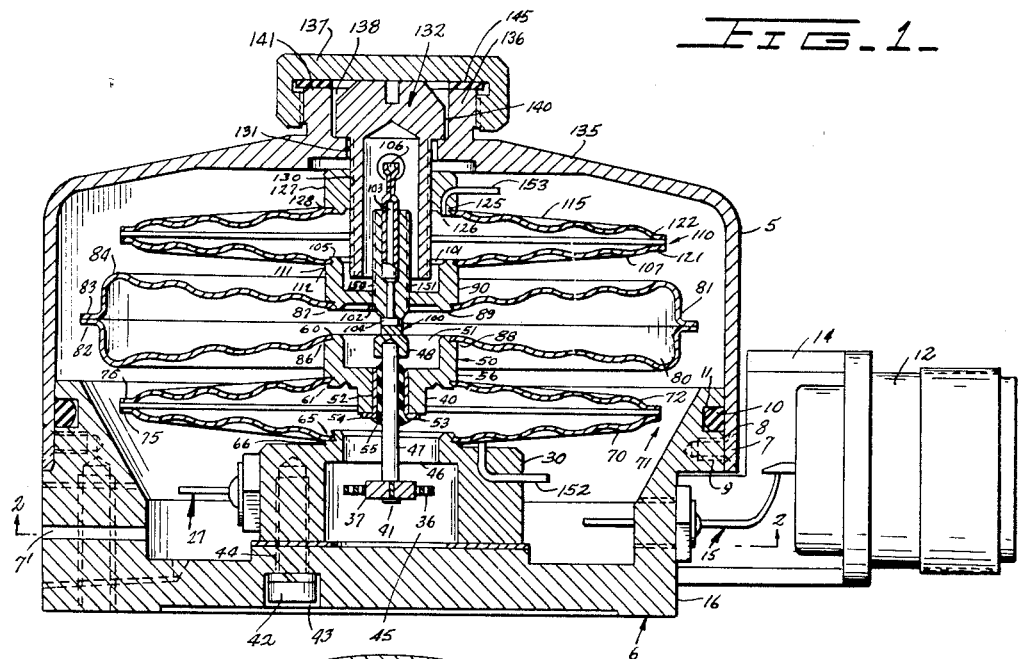
Figure 1 is a sectional view of the pressure switch of my invention.
Figure 2:
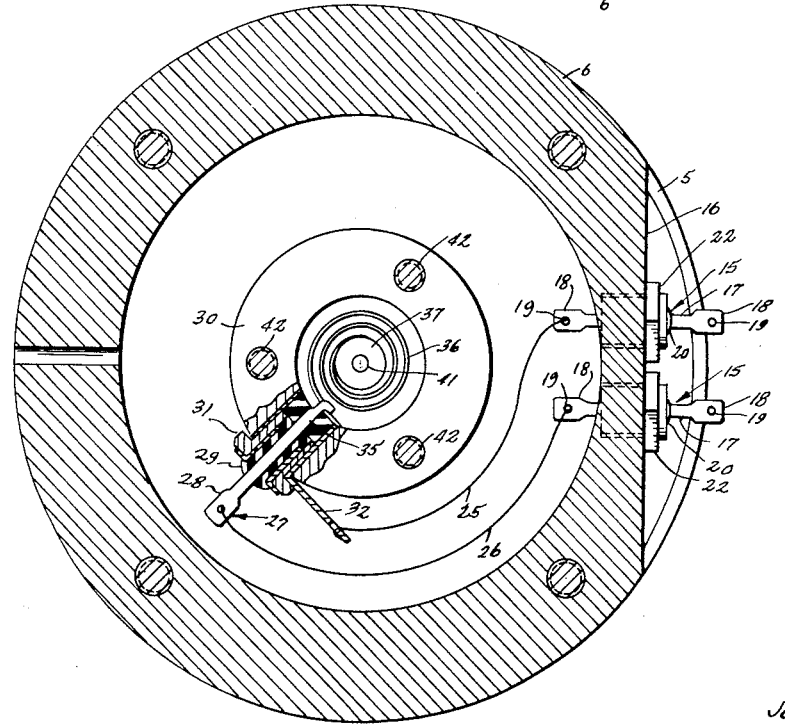
Figure 2 is a bottom view of the pressure switch of my invention.
Figure 3:
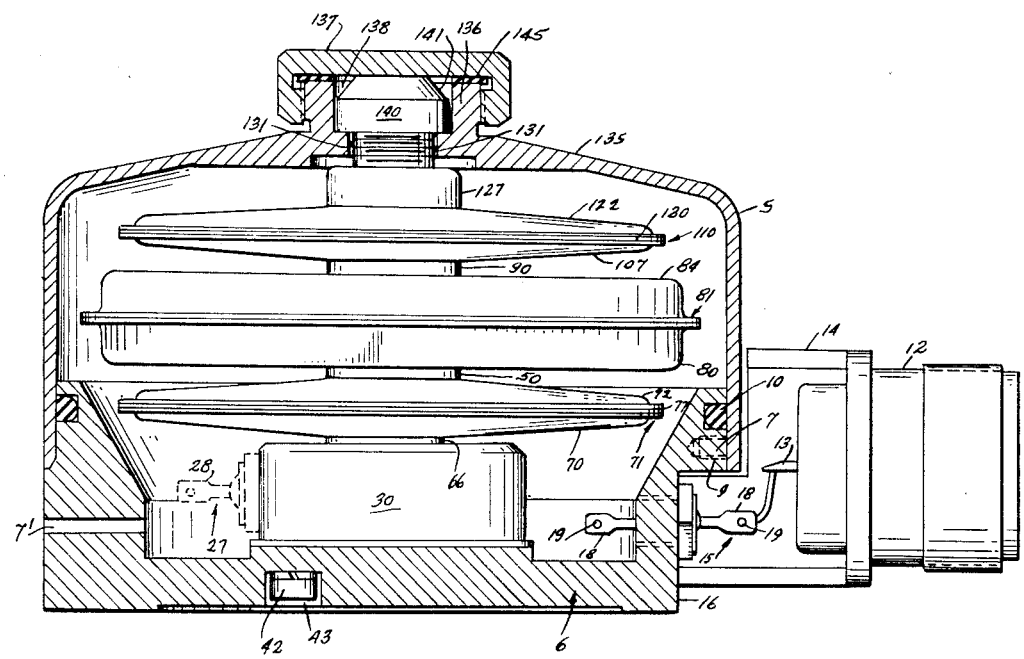
Figure 3 is a side view of the pressure switch of my invention with part of the housing removed.

Referring now to Figure 1 showing a cross-section of the pressure switch of my invention, the complete switch structure is enclosed by a housing 5 mounted on a switch base 6 and secured to base 6 by means of screws 7 engaging appropriate bores 8 in housing 5 and bores 9 in base 6. A gasket 10 is placed on a circular recess 11 located on the wall 16 of base 6.

When, therefore, housing 5 is secured to base 6, the interior of housing 5 will become air-tight by reason of the existence of gasket 10. Base 6 is provided with an air intake opening 7' through which the pressure in housing 5 can follow the variations of external pressure.

An electrical connector 12 is secured to base 6 by means of bracket 14. The two conductors 13 of the connectors 12 are soldered to two terminals 15 of the pressure switch which pass through wall 16 of base 6 and are secured thereto as shown hereinafter.

Each terminal 15 consists of a conducting bar 17 terminating at both ends with flattened out extensions 18 having central openings 19. Flattened extensions 18 in cooperation with openings 19 serve to receive electrical wires which can then be soldered thereto. Around the central portion of conducting bars 17 is a layer of insulating material 20. Both insulation 20 and conducting bars 17 are mounted inside a bolt-shaped member 22 which is secured to wall 16 of base 6 in such a position that one flattened out extension 18 of conducting bar 17 lies inside housing 5 while the other extends outwardly with respect to base 6.

To the flattened out extensions 18 located inside housing 5 are connected electrical conductors 25 and 26. Conductor 26, in this case the "hot" or positive lead, is connected at its other end to another terminal 27 mounted completely inside housing 5. Terminal 27 is similarly provided with a conducting bar 28 and an insulating layer 29 and is mounted to a support 30 by means of a bolt-shaped member 31. Ground lead 25 is connected, on the other hand, to a second conducting bar 32 making good electrical contact with metallic support 30. To the other end 35 of conducting bar 28 is secured a coil spring 36 made of resilient conducting material. Coil spring 36 is also connected to its mounting collet 37 which is mounted on insulated shaft 47. Parts 48 and 100 are each one piece of silver contact material.

Support 30 is a cylindrically shaped metallic block secured to the base 6 of the pressure switch by means of screws 42 engaging appropriate and aligned openings 43 and 44 on base 6 and support 30, respectively. Support 30 has a cylindrical axial opening 45 ending upwardly with a reduced diameter portion 46.

Movable contact 40 consists of a conducting rod 47 secured on one side to member 37 by press fit and carrying at its other end a contact making member 48. Conducting rod 47 extends from opening 45 through reducing diameter opening 46 into the diaphragm connecting block 50. Connecting block 50 is metallic and has two openings, an upper opening 51 and a lower one of reduced diameter 52. Into this lower opening 52 is fitted a metallic cylinder 53 having a flange 54 by means of which cylinder 53 is secured to block 50. An insulating layer 55 is interposed between rod 47 and cylinder 53, thus effectively insulating the positive connecting rod 47 from ground which is here any metallic part of the switch structure electrically connected to base 6, for example, block 50.

The larger diameter portion 56 of connecting block 50 is further provided with two circular recesses 60 and 61. Supporting block 30 is also provided with a circular recess 65 at its upper end 66. On recess 65 is secured the lower membrane 72 of cell 71. Cell 71 is thus seen to be made of two membranes 70 and 72 which are disc shaped and radially curved from the center to the rim. To increase their spring effect, membranes 70 and 72 are made of corrugated metal as clearly shown in Figure 1. The two membranes 70 and 72 have flanges 75 and 76 which are secured to each other by soldering.

On recess 60 of diaphragm connecting block 50 is secured the lower membrane 80 of a center capsule 81. Membrane 80 has a circular flange 82 directly attached to another flange 83 of the upper membrane 84 of center capsule 81.

The two membranes 80 and 84 of center capsule 81 are also made of corrugated material to increase their spring effect. They are also disc-shaped and radially curved, but they slope downwardly from the rim toward the center because of external pressure. Both membranes 80 and 84 have a central circular opening 86 and 87, respectively, through which membranes 80 and 84, respectively, can be slid on extension 88 of conducting block 50 and extension 89 of connecting block 90, respectively.

Center capsule 81 is evacuated so that it acts as the pressure responsive element of this pressure switch. Being completely closed, center capsule 81 protects contacts 48 and 100 from contamination by any extraneous substance like dust since both contacts 48 and 100 are housed in the interior of center capsule 81.

Center capsule 81 is properly evacuated through tubing 103 extending at one end 104 into the interior of center capsule 81 and closed air-tightly at its other end 106 after the evacuation process.

The second cell connecting block 90 has two coaxial bores 101 and 102. Bore 102 is much smaller than bore 101 and is internally threaded. Connecting block 90 has an upper extension 105 on which membrane 107 of outer cell 110 is secured. More specifically, membrane 107 having a central opening 111 is secured to a recess 112 of connecting block 90.

A second membrane 115 of a shape similar to membrane 107 is secured to membrane 107 by soldering. Membranes 107 and 115 of outer cell 110 are exactly similar to membranes 70 and 72 of cell 71. Membrane 115 also has a center opening 125 engaging an extension 126 of a metallic block 127 and is secured to metallic block 127 at its recess 128. Metallic block 127 has a central internally threaded bore 130 aligned with a similar non-threaded bore 131 located in the upper portion of housing 5. A regulating screw 132 engages threads of bore 130 passing through bore 131.

It is thus seen that block 127 can be positioned at different levels with respect to the top 135 of housing 5 by means of appropriate rotations of adjusting screw 132. The top portion 135 of housing 5 has a central cylindrically shaped externally threaded extension 136 to be engaged by a cap 137 with internal threads. Extension 136 of housing 5 has an internal opening 138 of sufficient dimensions to house the head 140 of adjusting screw 132. Between cap 137 and the upper face 141 of extension 136 is placed a circular gasket 145 to make the interior of housing 5 air-tight when cap 137 is tightly screwed on extension 136 of housing 5.

Complementary contact 100 consists of a metallic rod 150 having a threaded outer surface 151 which engages the threaded bore 102 of connecting block 90 to which, after proper adjustment, it is soldered so that a movement of connecting block 90 will always correspond to a similar movement by complementary contact 100. Rod 150 extends into the interior of center capsule 81 where it can make electrical contact with contact member 48 of movable contact 40. The portion of rod 150 lying inside center capsule 81 is provided with the previously mentioned tubes 104 and axial tube 103 through which center capsule 81 is evacuated to the correct value of pressure.

The two outer cells 71 and 110 act essentially as springs. The two diaphragms are provided with capillary tubes 152 and 153, respectively, which serve to produce a time lag in the operation of pressure responsive capsule 81 as hereinafter described.

Although coil springs could be used instead of diaphragms 71 and 110, the diaphragms are better since they resist lateral motion due to lateral accelerations and can also produce the above-mentioned time lag.

It is evident now that when the external pressure varies slowly and, for example, decreases slowly, the center capsule 81, previously evacuated if this device is to be made responsive to absolute pressure, will expand and will move the two connecting blocks 50 and 90 away from each other, thus causing contacts 48 and 100 to separate from electrical engagement.

Since the external pressure was assumed to vary slowly, the pressure of outer cells 71 and 110 can follow this variation through capillaries 152 and 153, respectively, without any considerable lag in time.

When, on the other hand, the variation in pressure is very sudden while center capsule 81 expands following this variation in pressure, the pressure inside outer cells 71 and 110 cannot change instantaneously because air cannot flow in great quantities through capillaries 152 and 153.

Therefore, outer cells 71 and 110 having an interior pressure different from the external pressure will also expand (if a sudden decrease in pressure is here considered) and thus partly compensate for the expansion of center capsule 81 with the result that contact 48 will not come into electrical contact with contact 100 at the initial time.

If the variation in pressure should persist for a sufficiently long time thus permitting the pressure inside outer cells 71 and 110 to fall to the level of the external pressure through capillary tubes 152 and 153, outer cells 71 and 110 will return to their normal shape, thus permitting the closing of electrical contact between contact 48 and contact 100.

If such a high lag is not needed, it is only necessary to remove the capillaries 152 and 153 and leave large holes. In this latter case, because of the small interior volume of the pressure switch, there will be a very low lag in the operation of the pressure switch.

A high lag can also be obtained by providing cells 71 and 110 with very small openings instead of capillaries 152 and 153. And if, on the other hand, a lower lag should be required, it will only be necessary to enlarge such openings to permit easy flow of air from the interior of the housing 6 into the interior of cells 71 and 110 or vice versa.

It is also seen that if the pressure switch of my invention is subjected to sudden movement or shocks, the relative position of contacts 48 and 100 will not be changed because of the spring effect provided by the outer cells 71 and 110 and center capsule 81 which, as previously mentioned, are made of corrugated metal sheets.

It is further seen that center capsule 81 also serves to keep any extraneous matter from reaching the contacts 48 and 100, thus protecting them against possible damage. This is possible because, as previously mentioned, center capsule 81 is first evacuated and its outlet tube 103 is then closed as shown at 106.

For differential pressure measurements the center capsule 81 is still evacuated to protect the contacts 48 and 100 from contamination. However, now the two outer cells 71 and 110 have their interiors connected by tubings to a separate pressure inlet (not shown in the drawings). The other pressure inlet 7 still goes to the interior of the housing 6 which means the outside of all three cells 71, 81 and 110. Damping in this case can be secured by constricting the diameter of the tubing (not shown) connecting the interior of the two outer cells to the pressure inlet fitting.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

An electric switch responsive to sustained pressure variations, said switch having a pair of engageable contacts, an air tight pressure responsive capsule completely surrounding and enclosing said contacts and comprising a pair of circularly shaped membranes of corrugated resilient material, said capsule changing in volume inversely to the air pressure surrounding said capsule, a housing enclosing said switch, resilient means between said capsule and said housing, said resilient means comprising an upper and lower cell, each of said cells having a pair of circularly shaped membranes of corrugated resilient material and a capillary tube; the upper of said cells being positioned between the upper membrane of said capsule and the top portion of said housing and the lower of said cells being positioned between the lower membrane of said capsule and the base of said housing, said upper and lower cells compensating for the effect of vibration and acceleration on said electric switch.

References Cited in the file of this patent

UNITED STATES PATENTS

| | | |
|---|---|---|
| 1,265,765 | Ferris | May 14, 1918 |
| 2,035,966 | Hubbard et al. | Mar. 31, 1936 |
| 2,177,564 | Havill | Oct. 24, 1939 |
| 2,450,961 | Heymann et al. | Oct. 12, 1948 |
| 2,479,616 | Hasselhorn | Aug. 23, 1949 |
| 2,480,495 | Mejean et al. | Aug. 30, 1949 |
| 2,593,169 | Moore | Apr. 15, 1952 |
| 2,671,833 | Dunmeyer et al. | Mar. 9, 1954 |